Nov. 17, 1953    N. G. BRANSON    2,659,862
APPARATUS FOR ELECTRICAL MEASUREMENT
OF THICKNESS USING CURRENT RATIOS
Filed Nov. 1, 1951
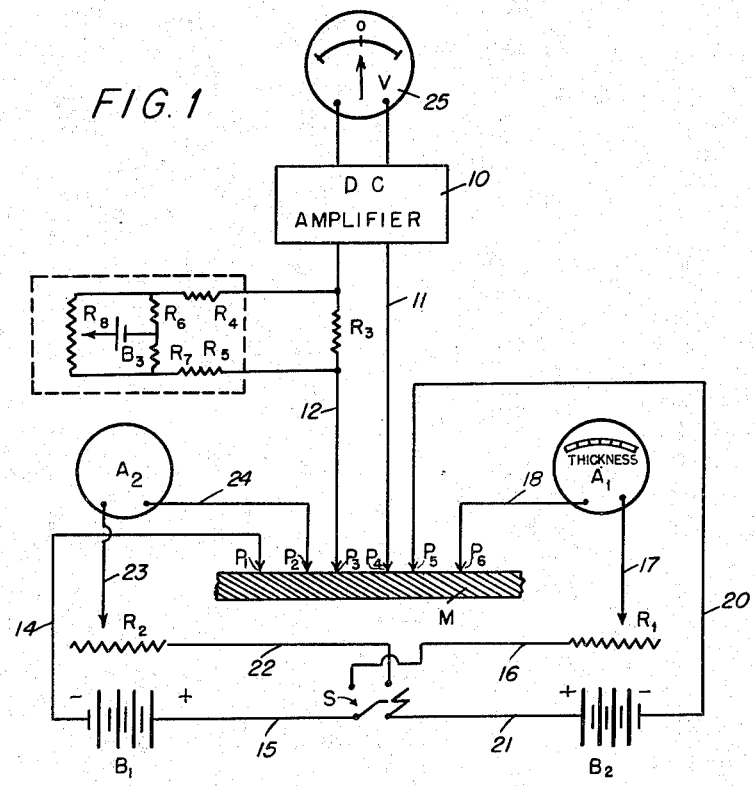
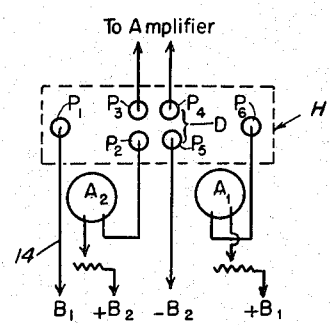
INVENTOR
Norman G. Branson
BY
Williams, Rich & Morse
ATTORNEYS Patented Nov. 17, 1953

2,659,862

UNITED STATES PATENT OFFICE 2,659,862

APPARATUS FOR ELECTRICAL MEASUREMENT OF THICKNESS USING CURRENT RATIOS

Norman G. Branson, Stamford, Conn., assignor to Branson Instruments, Inc., Stamford, Conn., a corporation of Connecticut Application November 1, 1951, Serial No. 254,405

7 Claims. (Cl. 324—64)

This invention relates to the electrical measurement of the thickness of electrically conductive bodies from one side only and more particularly to apparatus for making such measurements.

U. S. Patent 1,895,643 to Putnam describes a method of measuring thickness by sending a known current into a metal plate through two spring loaded contact points and measuring the potential developed at two other spring loaded contact points suitably spaced from the current applying points. The use of separate contact points for applying the current and for measuring the potential eliminates errors due to contact resistance. The potential which is developed at the measuring points is proportional to the current and the resistivity of the plate and is an inverse function of the plate thickness. Since the plate resistivity is usually an unknown factor or subject to substantial variations due to temperature, this method is subject to large errors. This method has been further developed as described in a paper by B. M. Thornton and W. M. Thornton entitled "The measurement of the thickness of metal walls from one surface only" published in "Proceedings," Inst. Mechanical Engineers, London, October-December 1938, page 349 at 387 et seq., wherein a method is described in which current is applied to the metal through a pair of contacts and measurement of potential is made through two other pairs of contacts having different spacings, the thickness being determined from the ratio of the two potential readings. This ratio is also a function of metal thickness but is independent of metal resistivity. This method used a sensitive light beam type of galvanometer to measure the relatively small voltages developed at the potential contacts. Others have used various types of electronic amplifiers to eliminate the necessity for the galvanometer. The methods and apparatus which have heretofore been used and described in the literature all require, however, reference to tabls or curves and calculations for each thickness reading.

The object of the present invention is to provide equipment which is simple to operate and which provides a direct indication of metal thickness which can be read on a meter dial without calculations or the use of tables or curves. The apparatus of the invention requires a minimum of operator training and skill, eliminates sources of errors, greatly increases the speed of operation, and overcomes operating difficulties which are inherent in previously known equipment when used under practical operating conditions.

The principle of operation of my invention is to apply opposed currents through two pairs of differently spaced contacts to the surface of the body to be measured and to adjust the current values until no potential difference exists between two other contacts applied to said body. The then existing current ratio is a function of thickness.

For a better understanding of the invention the present preferred embodiment thereof will be described in detail, for purposes of illustration, in connection with the drawings, in which, Fig. 1 is a schematic circuit diagram of apparatus operating in accordance with what may be called the current ratio null voltage method; and Fig. 2 is a detailed diagrammatic representation of a part of the circuit showing in particular one form of contact arrangement.

Referring to Fig. 1, the apparatus comprises a number of contacts $P_1$, $P_2$, $P_3$, $P_4$, $P_5$ and $P_6$ adapted to make good electrical contact with one surface of the metal or other conductive material M to be measured or tested. These contacts are mounted in a suitable holder so as to be spring-pressed against the surface of the metal, such a holder being described in U. S. Patent No. 2,476,943 to G. T. Brady. The holder is indicated in Fig. 2 at H. An infinite number of possible contact arrangements may be used, the contacts being arranged either linearly or grouped as shown in Fig. 2, subject to certain spacing requirements hereinafter described. In any event, they are arranged in pairs. Contacts $P_3$ and $P_4$, herein called the potential contacts, supply the minute current picked off of the surface of the metal to an amplifier 10. Contact $P_4$ is connected directly to the input of the amplifier through wire 11 and contact $P_3$ is connected through wire 12 and resistance $R_3$ to the input of the amplifier. The contacts $P_2$ and $P_5$, which will be referred to as the inner pair of current-supplying contacts, and the contacts $P_1$ and $P_6$, which will be referred to as the outer pair of current-supplying contacts, supply current to the metal or other material M in the manner now to be described.

Two independent sources of electric current are provided in the form of the batteries $B_1$ and $B_2$. The positive terminals of each of these batteries are connected to the two terminals on one side of a double-pole single-throw switch S, the two terminals on the other side of the switch being connected to the variable resistances $R_1$ and $R_2$ so that $R_1$ controls the current from battery $B_1$ and $R_2$ controls the current from battery $B_2$. The negative side of battery $B_1$ is connected directly to contact $P_1$ through wire 14. The positive side of battery $B_1$ is connected through wire 15, switch S, wire 16, resistance $R_1$, wire 17, ammeter $A_1$ and wire 18 to contact $P_6$. Similarly, the negative side of battery $B_2$ is connected directly to contact $P_5$ through wire 20 and the positive side of this battery is connected through wire 21, switch S, wire 22, resistance $R_2$, wire 23, ammeter $A_2$ and wire 24 to contact $P_2$. It will be seen that contacts $P_1$ and $P_6$ introduce current into the body M which flows in one direction and the contacts $P_2$ and $P_5$ introduce current from an independent source into the body M which flows in the opposite direction, so that these two currents buck each other.

It will also be evident that with switch S in its open position the existence of any potential developed between the potential contacts $P_3$ and $P_4$, such as thermal or contact potentials, may be determined with the switch S in open position by inspection of the meter 25 which is connected to the output of amplifier 10. It is desirable to eliminate such potential before proceeding with measurement, in a manner hereinafter explained.

Contacts $P_2$ and $P_5$ are spaced from the contacts $P_3$ and $P_4$ respectively by a distance D (Fig. 2) which is about the same as the minimum thickness of the body to be measured. Contacts $P_1$ and $P_6$ are spaced from the contacts $P_2$ and $P_5$ respectively by approximately a distance which is equal to or greater than the maximum thickness which the device will be required to measure. A convenient arrangement of the contact is shown in Fig. 2 where the closely spaced contacts, namely, contacts $P_2$, $P_3$, $P_4$ and $P_5$, are arranged at the corners of a square and the more widely spaced contacts $P_1$ and $P_6$ are symmetrically arranged with reference to this central group.

A number of different heads or probes may be provided for use as part of the apparatus, having different spacings and arrangements of contacts suitable for measuring different ranges of thickness and for each probe a corresponding scale is provided on the thickness measuring meter, which is the ammeter $A_1$.

In the illustrative embodiment shown, the current applied to the metal is direct current and it will be understood that the potentials developed between the measuring contacts $P_3$ and $P_4$ are very minute, being of the order of a few microvolts. To amplify this small direct current, a polarity sensitive direct current amplifier of the breaker-modulated type is used. Suitable amplifiers of this type are described in U. S. Patents 2,114,298 to Ross and Gunn and 2,143,788 to Sargeant and Hoepper, and an interrupter or breaker suitable for use in my apparatus with such amplifiers is described in Patent No. 2,442,299 to Liston and Quinn. The output from the amplifier is connected to the zero center voltmeter 25. This is a rugged instrument suitable for field use and amplification of the current flowing between $P_3$ and $P_4$ makes its use possible.

In devices of this kind, one source of error is to be found in thermal and contact potentials developed across the measuring contacts $P_3$ and $P_4$. Others have sought to eliminate the effect of such potentials by averaging two readings taken with a single current applied to the object to be measured in opposite directions, that is by reversing its polarity between readings, thus requiring an added computation. I provide means for eliminating such potentials before proceeding with the measurement. This means supplies a bucking current, applied across resistor $R_3$ which is, for example, 1 ohm. The bucking current circuit consists of battery $B_3$, resistors $R_6$ and $R_7$ and potentiometer $R_8$, connected as shown, and is connected across resistor $R_3$ through dropping resistors $R_4$ and $R_5$. With switch S open and the contacts in place on the work, the bucking current is adjusted as to value and polarity to produce a zero reading on meter 25. Thereafter the thickness measurement is immediately made in the following manner, with assurance that it is not rendered erroneous by reason of contact or thermal potentials.

Utilizing the above described apparatus, the method of determining thickness involves the following steps:

The probe or head carrying the contacts $P_1$ through $P_6$ is applied to one surface of the conductive body M to be measured, the surface having first been cleaned to assure good electrical contact.

Any deflection of meter 25, resulting from contact or thermal potentials, is balanced out by adjustment of potentiometer $R_8$ of the bucking circuit so that the meter is at its electrical and mechanical zero.

Switch S is then moved to apply current from the batteries $B_1$ and $B_2$ simultaneously to the inner and outer pairs of current contacts $P_2$, $P_5$ and $P_1$, $P_6$. The $B_2$ battery current is then first adjusted by $R_2$ to any predetermined value, say 1 amp. The $B_1$ battery current is then adjusted by $R_1$ until meter 25 reads zero, showing a nullification of the adjusted $B_2$ battery current, and the thickness is read directly on an appropriate calibrated scale provided on meter $A_1$.

Meter $A_1$ may have a plurality of scales reading in thickness, each scale pertaining to a particular contact carrying head or probe. These scales are calibrated by taking measurements with their respective probes on plates of known thickness.

It will be evident that thickness measurements utilizing the above-described method and apparatus are made quickly and with ease merely by the successive adjustment of three variable resistances, whereupon thickness is directly indicated on a meter dial. The equipment is such that it is capable of being ruggedly constructed and is well adapted for field use.

The principle of current-ratio null-voltage measurement of thickness, which I believe to be novel, may be applied without the use of the amplifier 10 if a sufficiently sensitive galvanometer is substituted for the voltmeter 25 but such apparatus would require more careful handling.

While the foregoing apparatus has been described primarily as a thickness measuring device it may be used for other purposes such as the detection and location of flaws which are, in effect, local modifications of the measurable thickness.

The foregoing description is to be taken merely as an illustration and not as a limitation on the invention as hereinafter defined in the claims.

What is claimed is:

1. Apparatus for the electrical measurement of thickness of a conductive body from one side only comprising a probe having inner and outer pairs of current supplying contacts and a pair of potential contacts adapted to be applied to said side, two independent sources of electric current, means for supplying said current to said pairs of current supplying contacts so as to cause the currents to flow through a common portion of said body in opposite directions, the potential contacts engaging said common portion, meters responsive to the values of said currents, means for adjusting said values, and a meter adapted to show a zero potential across said potential contacts.

2. Apparatus for the electrical measurement of thickness of a conductive body from one side only comprising a probe having inner and outer pairs of current supplying contacts and a pair of potential contacts adapted to be applied to said side, a bucking current circuit having means for controlling the value and polarity of the bucking current and arranged to oppose potential across said potential contacts, two independent sources of electric current, means for supplying said current to said pairs of current supplying contacts so as to cause the currents to flow through a common portion of said body in opposite directions, the potential contacts engaging said common portion, meters responsive to the values of said currents, means for adjusting said values, and a meter adapted to show a zero potential across said potential contacts.

3. Apparatus for the electrical measurement of thickness of a conductive body from one side only comprising a probe having inner and outer pairs of current supplying contacts and a pair of potential contacts adapted to be applied to said side, two independent sources of electric current, means for supplying said current to said pairs of current supplying contacts so as to cause the currents to flow through a common portion of said body in opposite directions, the potential contacts engaging said common portion, meters responsive to the values of said currents, means for adjusting said values, an amplifier having its input connected to said potential contacts, and a zero-center voltmeter connected to the output of said amplifier.

4. Apparatus for the electrical measurement of thickness of a conductive body from one side only comprising a probe having inner and outer pairs of current supplying contacts and a pair of potential contacts adapted to be applied to said side, a bucking current circuit having means for controlling the value and polarity of the bucking current arranged to oppose potential across said potential contacts, two independent sources of electric current, means for suppling said current to said pairs of current supplying contacts so as to cause the currents to flow through a common portion of said body in opposite directions, the potential contacts engaging said common portion, meters responsive to the values of said currents, means for adjusting said values, an amplifier having its input connected to said potential contacts, and a zero-center voltmeter connected to the output of said amplifier.

5. Apparatus for the electrical measurement of thickness of a conductive body from one side only comprising a probe having inner and outer pairs of current supplying contacts and a pair of potential contacts adapted to be applied to said side, two independent sources of electric current, means for supplying said current to said pairs of current supplying contacts so as to cause the currents to flow through a common portion of said body in opposite directions, the potential contacts engaging said common portion, meters responsive to the values of said currents, means for adjusting said values, an amplifier having its input connected to said potential contacts, one of said meters having a scale calibrated in terms of thickness, and a zero-center voltmeter connected to the output of said amplifier.

6. Apparatus for the electrical measurement of thickness of a conductive body from one side only comprising a probe having inner and outer pairs of current supplying contacts and a pair of potential contacts adapted to be applied to said side, two independent sources of electric current, means for supplying said current to said pairs of current supplying contacts so as to cause the currents to flow through a common portion of said body in opposite directions, the potential contacts engaging said common portion, meters responsive to the values of said currents, means for adjusting said values, an amplifier having its input connected to said potential contacts, the said meter which is in the circuit including the outer pair of current supplying contacts having a scale calibrated in terms of thickness, and a zero-center voltmeter connected to the output of said amplifier.

7. Apparatus for the electrical measurement of the thickness of a conductive body from one side only comprising, contact means for engaging said body and adapted to convey two separate currents therto, two independent sources of electric current electrically connected to said contact means with opposite polarity, said contact means being so arranged that the currents from said sources flow through a common portion of said body in opposite directions, indicating means responsive to the separate values of said currents, means for adjusting at least one of said values, a pair of potential contacts, means for applying said potential contacts to said common portion of said body, and means for indicating when the potential across said potential contacts is zero.

NORMAN G. BRANSON.

References Cited in the file of this patent

UNITED STATES PATENTS

| Number | Name | Date |
| --- | --- | --- |
| 2,186,826 | Edgar | Jan. 9, 1940 |
| 2,476,943 | Brady | July 19, 1949 |